United States Patent [19]
Tomoe et al.

[11] Patent Number: 5,953,135
[45] Date of Patent: *Sep. 14, 1999

[54] IMAGE FORMING APPARATUS WITH AN UPPER BODY PORTION SHIFTED RELATIVE TO A LOWER BODY PORTION TO PROVIDE A VIEW OF A PAPER DISCHARGING SECTION LOCATED BETWEEN THE BODY PORTIONS

[75] Inventors: Tetsuro Tomoe; Toshihiko Watanabe; Yoshifumi Okauchi; Mitsuharu Yoshimoto; Susumu Hanano, all of Osaka, Japan

[73] Assignee: Mita Industrial Co., Ltd., Osaka, Japan

[*] Notice: This patent is subject to a terminal disclaimer.

[21] Appl. No.: 08/861,786

[22] Filed: May 22, 1997

[30] Foreign Application Priority Data

May 31, 1996 [JP] Japan ..................................... 8-138386

[51] Int. Cl.$^6$ ..................................................... H04N 1/04
[52] U.S. Cl. ............................................ 358/498; 358/496
[58] Field of Search .................................. 358/474, 496, 358/497, 498, 401, 494; 399/405; 271/207

[56] References Cited

U.S. PATENT DOCUMENTS

| | | | |
|---|---|---|---|
| 4,888,650 | 12/1989 | Abuyama | 358/494 |
| 5,513,018 | 4/1996 | Nisimura | 358/474 |
| 5,680,203 | 10/1997 | Kobayashi et al. | 358/498 |
| 5,715,500 | 2/1998 | Nakazato et al. | 358/496 |

*Primary Examiner*—Joseph Mancuso
*Assistant Examiner*—Hien Truong
*Attorney, Agent, or Firm*—Smith, Gambrell & Russell, LLP; Beveridge, DeGrandi, Weilacher & Young; Intellectual Property Group

[57] ABSTRACT

The present invention provides an image forming apparatus in which paper sheets are not forgotten in a paper discharging section so provided in the main body of the apparatus so as to open toward the front. An operation panel is arranged in an upper part on the front side of the main body of the image forming apparatus 16, and a side space 16 is provided on the right of the operation panel. An operator can visually confirm paper sheets discharged into a paper discharging section from above through the side space. The paper discharging section is in the main body of the image forming apparatus, whereby economy of space can be achieved.

11 Claims, 6 Drawing Sheets

IMAGE FORMING APPARATUS WITH AN UPPER BODY PORTION SHIFTED RELATIVE TO A LOWER BODY PORTION TO PROVIDE A VIEW OF A PAPER DISCHARGING SECTION LOCATED BETWEEN THE BODY PORTIONS

CROSS REFERENCE TO RELATED APPLICATION

This application claims priority benefits under 35 USC §119 of Japanese Patent Application Serial No. 8-138386, the disclosure of which is incorporated by reference.

BACKGROUND OF THE INVENTION

1. Field of the Invention

The present invention relates to an image forming apparatus capable of performing a multi-function such as a copy function and a facsimile function.

2. Description of the Related Art

In recent years, the demand for an image forming apparatus performing a multi-function has been increased. There is provided an image forming apparatus on which a copy function, a FAX function, a printer function, a PC-FAX function, a scanner function, and the like are carried, for example. Such a multi-function image forming apparatus can be used even in a narrow office because significant economy of space is achieved, as compared with a case where a plurality of apparatuses corresponding to the respective functions are arranged.

On the other hand, when a paper feeding cassette for feeding paper sheets for image recording and a paper discharge tray for discharging the paper sheets each having an image recorded thereon are projected from both sides of the main body of the image forming apparatus, a wider setting space is required. Therefore, there is provided an image forming apparatus so adapted that a paper feeding cassette can be loaded in its main body and having a paper discharge space provided in the main body.

Generally, a space in front of the main body of the image forming apparatus is a vacant space for operating the image forming apparatus, so that the paper feeding cassette can be taken out forward. Further, the paper discharge space opens toward the front of the main body of the image forming apparatus, so that the paper sheets discharged into the paper discharge space are taken out forward.

Consider a case where paper sheets received by a FAX are outputted, for example. In an image forming apparatus in which a paper discharge tray is projected sideward from its main body, the paper sheets discharged into the paper discharge tray are not forgotten to be taken because they are very noticeable from above.

In the image forming apparatus having the paper discharge space provided in its main body, however, paper sheets discharged into the paper discharge space cannot be visually confirmed from above, whereby the paper sheets may be forgotten to be taken. For example, if an operator bends and looks into the paper discharge space from the front of the paper discharge space, the presence or absence of the paper sheets can be confirmed. However, such an operation is troublesome to the operator. Accordingly, the operator may not, in some cases, perform such an operation so that the paper sheets discharged into the paper discharge space are left as they are for a long time.

In a case where paper sheets are conveyed on a center basis by a paper conveying path, when the paper sheets discharged into the paper discharge space are narrow, edges on the take-out side (front edges) of the paper sheets are in an inner position. As a result, the paper sheets are difficult to take out.

SUMMARY OF THE INVENTION

A first object of the present invention is to provide an image forming apparatus in which economy of space is achieved, and discharged paper sheets are not forgotten to be taken.

A second object of the present invention is to provide an image forming apparatus in which discharged paper sheets are easily taken out.

From an aspect, the invention provides an image forming apparatus having an upper portion and a lower portion in its main body, a paper discharging section into which paper sheets each having an image recorded thereon are discharged being formed between the upper portion and the lower portion, which is characterized in that a space which is not blocked by the upper portion is formed above the paper discharging section on the side of its front edge in order that the paper sheets discharged into the paper discharging section can be confirmed.

From another aspect, the invention is characterized in that in the above-mentioned image forming apparatus, the upper portion comprises an optical system for illuminating and scanning an original, and an operation panel having various operation keys, a section containing the optical system being approximately rectangular as viewed from the top, and the operation panel being projected from a part of a front edge of the optical system containing section, the space being formed in a portion, where the operation panel is not positioned, in front of the optical system containing section.

From a further aspect, the invention is characterized in that in the above-mentioned image forming apparatus, the paper discharging section is formed on the upper surface of the lower portion.

From a further aspect, the invention is characterized in that in the above-mentioned image forming apparatus, the lower portion comprises an image forming section and a paper conveying path for conveying the paper sheets, the paper conveying path being so constructed that the paper sheets which are fed to the image forming section and are discharged into the paper discharging section after an image formed in the image forming section is recorded thereon are conveyed along a front edge of the lower portion with the front edge used as the basis.

From a further aspect, the invention is characterized in that in the above-mentioned image forming apparatus, the paper discharging section is so inclined that rear ends in the direction of discharge of the paper sheets discharged into the paper discharging section are decreased in height in order that the paper sheets are lined up with each other upon being shifted toward the rear ends in the direction of discharge.

From a further aspect, the invention is characterized in that in the above-mentioned image forming apparatus, a space which is not blocked by the upper portion is arranged in the position where a part of the rear ends of the paper sheets discharged into the paper discharging section can be visually confirmed.

From a further aspect the invention is characterized by further comprising, in the above-mentioned image forming apparatus, a connecting portion for connecting the upper portion and the lower portion with each other, a window for lighting by introducing light toward the paper discharging section being formed in the connecting portion.

From a further aspect the invention is characterized in that in the above-mentioned image forming apparatus, the upper portion is arranged in a state where it is shifted by a predetermined amount toward the rear edge of the lower portion as viewed from the top from the lower portion.

From a further aspect the invention is characterized in that in the above-mentioned image forming apparatus, there exists a space where the lower portion does not exist below the upper portion on the side of its rear edge, and the upper portion comprises a driving mechanism including a motor for driving the optical system, the driving mechanism being so arranged as to be projected toward the space where the lower portion does not exist.

From a further aspect the invention is characterized in that in the above-mentioned image forming apparatus, the motor is so arranged as to be positioned in the contour of the upper portion which is approximately rectangular as viewed from the top.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
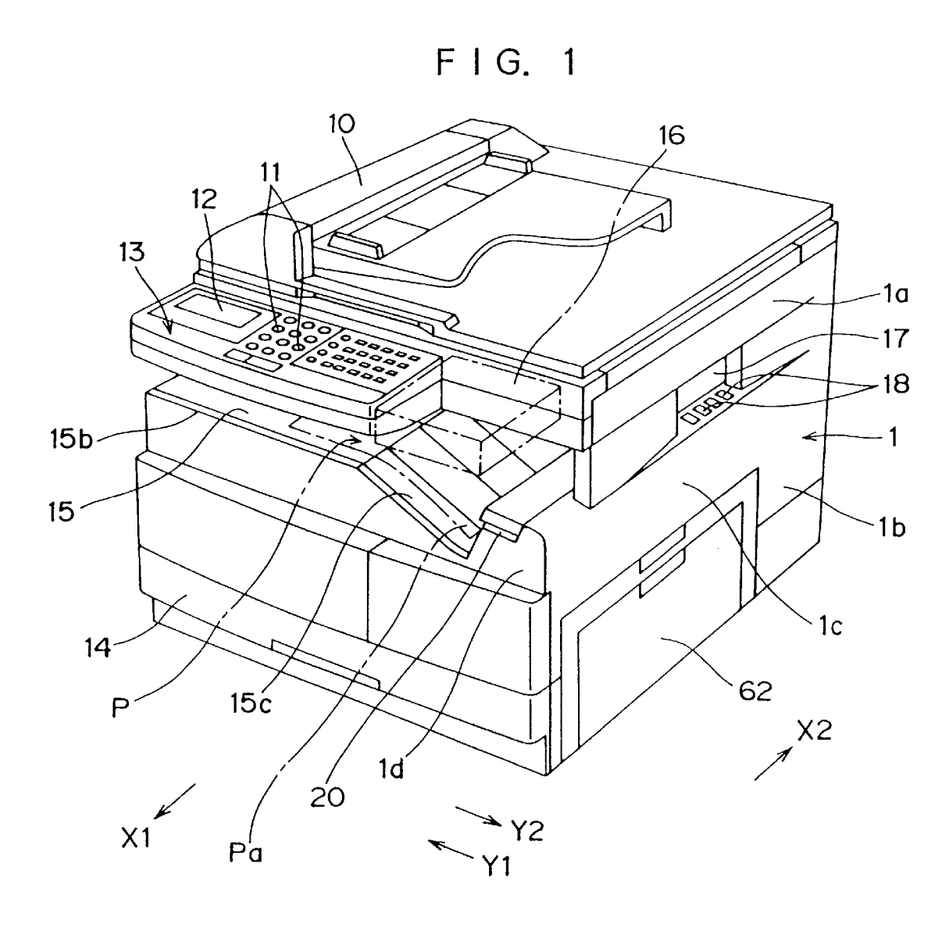
FIG. 1 is a schematic perspective view showing an image forming apparatus according to one embodiment of the present invention.

FIG. 1 is a schematic perspective view showing an image forming apparatus according to an embodiment of the present invention. Referring to FIG. 1, an automatic document feeder 10 (hereinafter merely referred to as an ADF 10) is provided on the upper surface of the main body of an image forming apparatus 1, and an operation panel 13 having various operation keys 11 and a display section 12 is arranged in an upper part of the front side X1 of the main body of the image forming apparatus 1. The operation panel 13 is thus arranged in the upper part of the front side X1 of the main body of the image forming apparatus 1, whereby the upper surface of the main body of the image forming apparatus 1 is so effectively utilized that the ADF 10 is arranged thereon. Further, the main body of the image forming apparatus 1 has a paper discharging section 15 opening toward the front X1 below the operation panel 13. A paper feeding cassette 14 which can be pulled out forward X1 from the main body of the image forming apparatus 1 is mounted on the lower part of the main body of the image forming apparatus 1.

On the other hand, the image forming apparatus is equipped with a modem for modulating image data to be transmitted and demodulating image data to be received and an NCU (Network Control Unit) for making connection to an external communication network, which are not illustrated, in order to perform a facsimile function in addition to a copy function.

Figure 2:
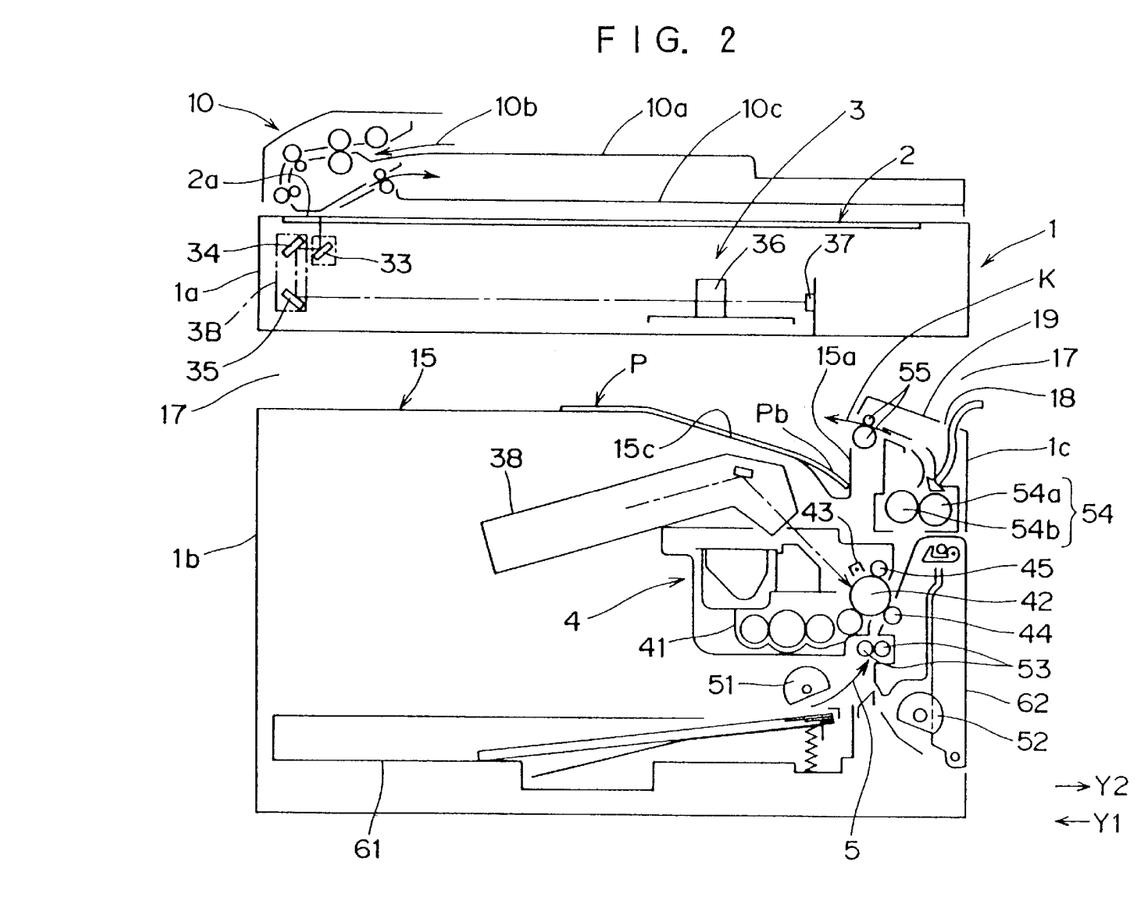
FIG. 2 is a schematic front view showing an internal construction of the image forming apparatus.

Referring to FIG. 2 which is a schematic front view showing the internal cross section of the image forming apparatus, in the image forming apparatus, when the ADF 10 is used, an original is conveyed to a reading region for ADF 2a by the ADF 10. At this time, an optical system 3 is brought into a fixed state, the surface of the original conveyed by the ADF 10 is illuminated and scanned by the optical system 3 brought into the fixed state, and an image is formed on the basis of the illumination and scanning. On the other hand, when a book original, for example, is put on an original platen surface 2 to make copies, the optical system 3 is brought into a movable state, so that its original surface is illuminated and scanned by the moving optical system 3, and an image is formed on the basis of the illumination and scanning.

In the ADF 10, when a plurality of originals whose surfaces are directed upward are set in an original setting section 10a, the originals pass through the reading region 2a set in an end of the original platen surface 2 while being reversed through an original conveying path 10b one at a time, and are then successively discharged into an original discharge stand 10c in a state where they are turned over in descending order from the uppermost original.

The main body of the image forming apparatus 1 comprises in its inner part (1) the optical system 3 for illuminating and scanning an original put on the original platen surface 2 or an original conveyed to the reading region for ADF 2a by the ADF 10 and introducing light reflected from the original into the photosensitive drum 42, (2) an image forming section 4 for developing an electrostatic latent image formed on a photosensitive drum 42 by a developing device 41 and then transferring the electrostatic latent image on paper sheets, (3) a paper conveying section 5 for pulling out the paper sheets from a paper feeding cassette 61 or a manual paper feeding tray 62 opened at required time and discharging the paper sheets into a paper discharging section 15 in the main body of the image forming apparatus 1 through the image forming section 4, and the like.

The optical system 3 illuminates the original by a fluorescent lamp with a reflecting plate (not shown) fixed to a first moving frame 3A, accepts the light reflected from the original in a line sensor 37 successively through a first mirror 33 fixed to the first moving frame 3A, a second mirror 34 fixed to a second moving frame 3B, a third mirror 35, and a lens 36, and irradiates laser light corresponding to input to the line sensor 37 onto the photosensitive drum 42 by a laser optical system 38. The laser optical system 38 is a known one including a laser oscillator, a modulator, a lens, and a rotating polygon mirror, which are not illustrated in detail.

As the image forming section 4, a charging corona discharger 43, the developing device 41, a transfer roller 44, and a cleaning roller 45 are arranged in this order around the photosensitive drum 42. The image forming section 4 is so adapted as to form an original image on an outer peripheral surface of the photosensitive drum 42 uniformly charged by the charging corona discharger 43 to form an electrostatic latent image, then develop the electrostatic latent image into a toner image by the developing device 41, transfer the toner image on the paper sheets by the transfer roller 44, and recover the remaining toner by the cleaning roller 45. The image forming section 4 is formed as a unit as a whole, and can be integrally pulled out forward X1.

The paper conveying section 5 comprises a paper feeding roller 51 for pulling out paper sheets P one at a time from the paper feeding cassette 61, a paper feeding roller 52 for pulling out the paper sheets from the manual paper feeding tray 62, a pair of registration rollers 53 for causing the paper sheets P conveyed by each of the paper feeding rollers 51 and 52 to temporarily wait with leading ends of the paper sheets P abutting thereon, a heat roller 54b and a pressure roller 54a which constitute a fixing roller 54 for fixing a toner image transferred on the paper sheets P, and a pair of discharge rollers 55 in this order. The discharge rollers 55 discharge the paper sheets P leftward Y1 along the direction of conveyance K in FIG. 2 and 3.

Figure 3:
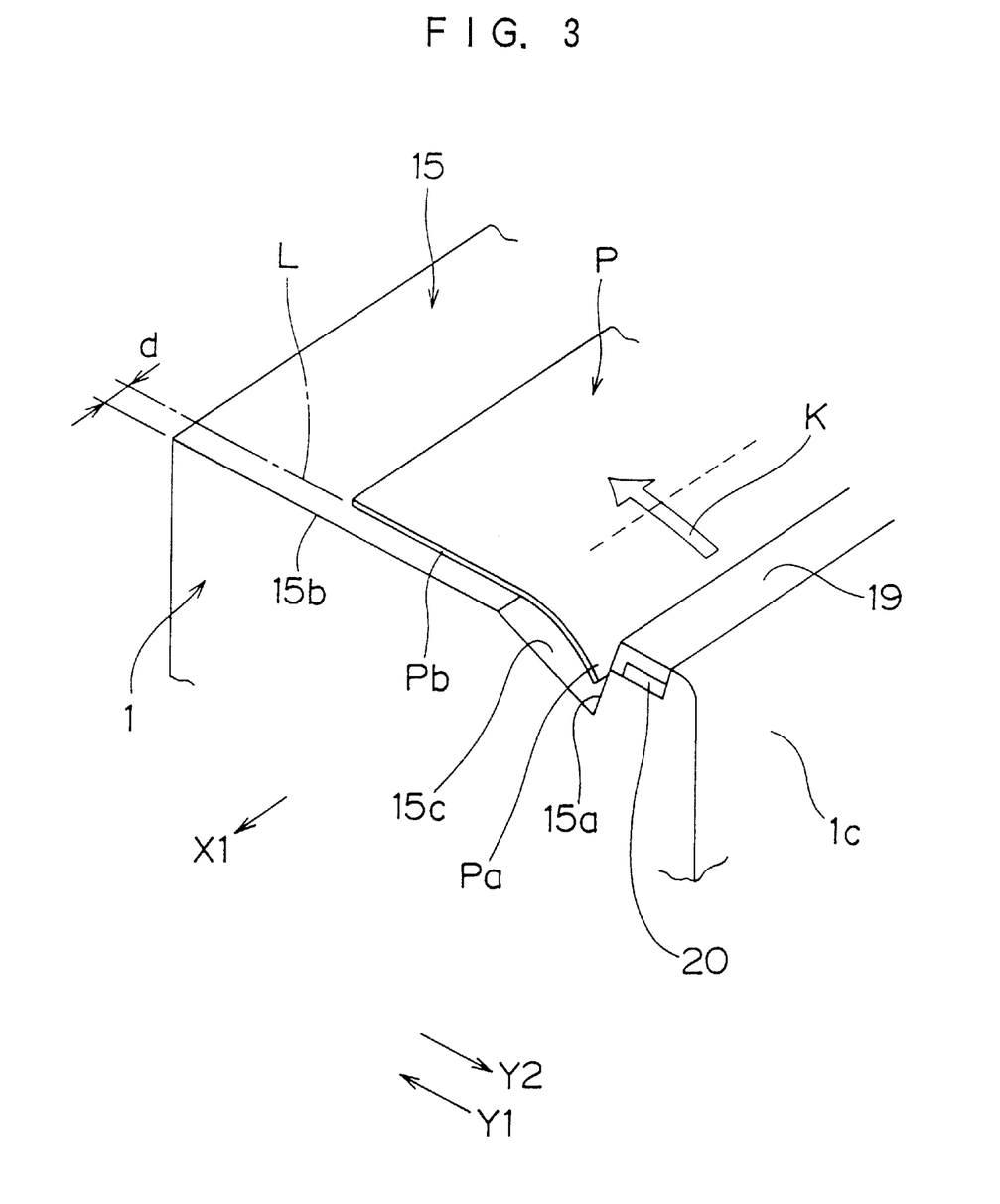
FIG. 3 is a enlarged schematic perspective view showing a paper discharging section.

Referring to FIG. 2 and FIG. 3 which is an enlarged schematic perspective view of the paper discharging section 15, the paper sheets are discharged into the paper discharging section 15 leftward Y1 along the direction of conveyance K. The paper discharging section 15 has an inclined portion 15c so inclined that its part corresponding to rear ends Pa in the direction of conveyance of the paper sheets P discharged is the lowest (inclined downward toward the right Y2 in the drawings). The rear ends Pa in the direction of conveyance of the paper sheets P discharged into the paper discharging section 15 are lined up at a rear end 15a in the direction of conveyance of the paper discharging section 15 by the function of the inclined portion 15c. Even if a lot of paper sheets P are discharged into the paper discharging section 15 to enter a laminated state, the rear ends Pa in the direction of conveyance of the paper sheets P in the laminated state do not prevent a paper sheet P to be subsequently discharged from being discharged.

Figure 5:
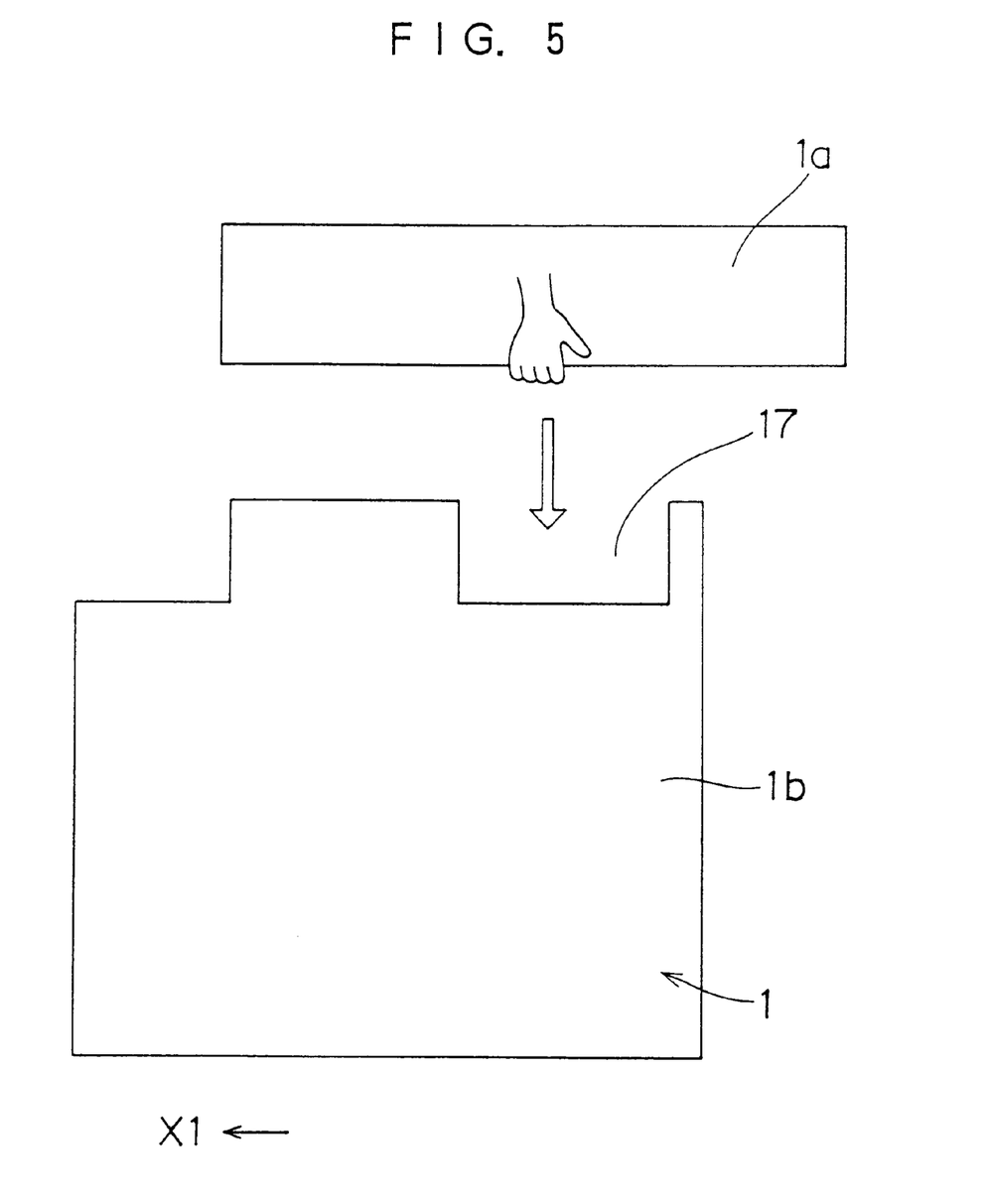
FIG. 5 is a schematic side view showing one step in a case where the main body of the image forming apparatus is assembled.

As mentioned above, the optical system 3, the image forming section 4, the paper conveying section 5, and the like are contained in the main body of the image forming apparatus 1. However, referring to FIG. 2, an upper portion 1a containing the optical system 3 and a lower portion 1b containing the image forming section 4 and the paper conveying section 5 below the upper portion 1a are separably constructed. When the image forming apparatus is assembled, the upper portion 1a and the lower portion 1b are combined with each other with the upper portion 1a put on the lower portion 1b, as shown in FIG. 5. The paper discharging section 15 is provided on the upper part of the lower portion 1b and is interposed between the upper portion 1a and the lower portion 1b.

On the other hand, referring to FIGS. 1 and 2, openings 17 (only one of them is illustrated in FIG. 1) serving as windows for lighting which connect the paper discharging section 15 with the exterior are respectively formed on both side surfaces of the main body of the image forming apparatus 1. Consequently, light is introduced into the paper discharging section 15 so that a space of the paper discharging section 15 is not darkened, to make it easy to visually confirm the paper sheets P discharged into the paper discharging section 15.

Each of the openings 17 is provided in an abutting portion of respective side surfaces of the upper and lower portions 1a and 1b. The size and the position of each of the openings 17 are so set that an operator's hand supporting a lower edge in an approximately central position of each of side surfaces of the upper portion 1a can be introduced into the opening, as shown in FIG. 5, at the time of assembling the image forming apparatus. When the main body of the image forming apparatus 1 is assembled, therefore, the hands are prevented from being caught between the upper portion 1a and the lower portion 1b, and both the portions 1a and 1b are combined with each other with high positional precision.

Although the opening 17 is arranged in the lower portion 1b in the present embodiment, it may be arranged in the upper portion 1a or arranged so as to extend over both the portions 1a and 1b.

Furthermore, a plurality of main vent holes 18 facing the opening 17 on a right side surface 1c of the main body of the image forming apparatus 1 are provided in a section 19 for sectioning an upper surface on the right side of the lower portion 1b so as to connect with the paper discharging section 15. On the other hand, a sub vent hole 20 having an open area significantly smaller than the open area of the whole of the plurality of main vent holes 18 is formed in the upper part of a front surface 1d of the lower portion 1b. Cooling air is supplied to the fixing roller 54 through the vent holes 20 and 18.

Figure 4:
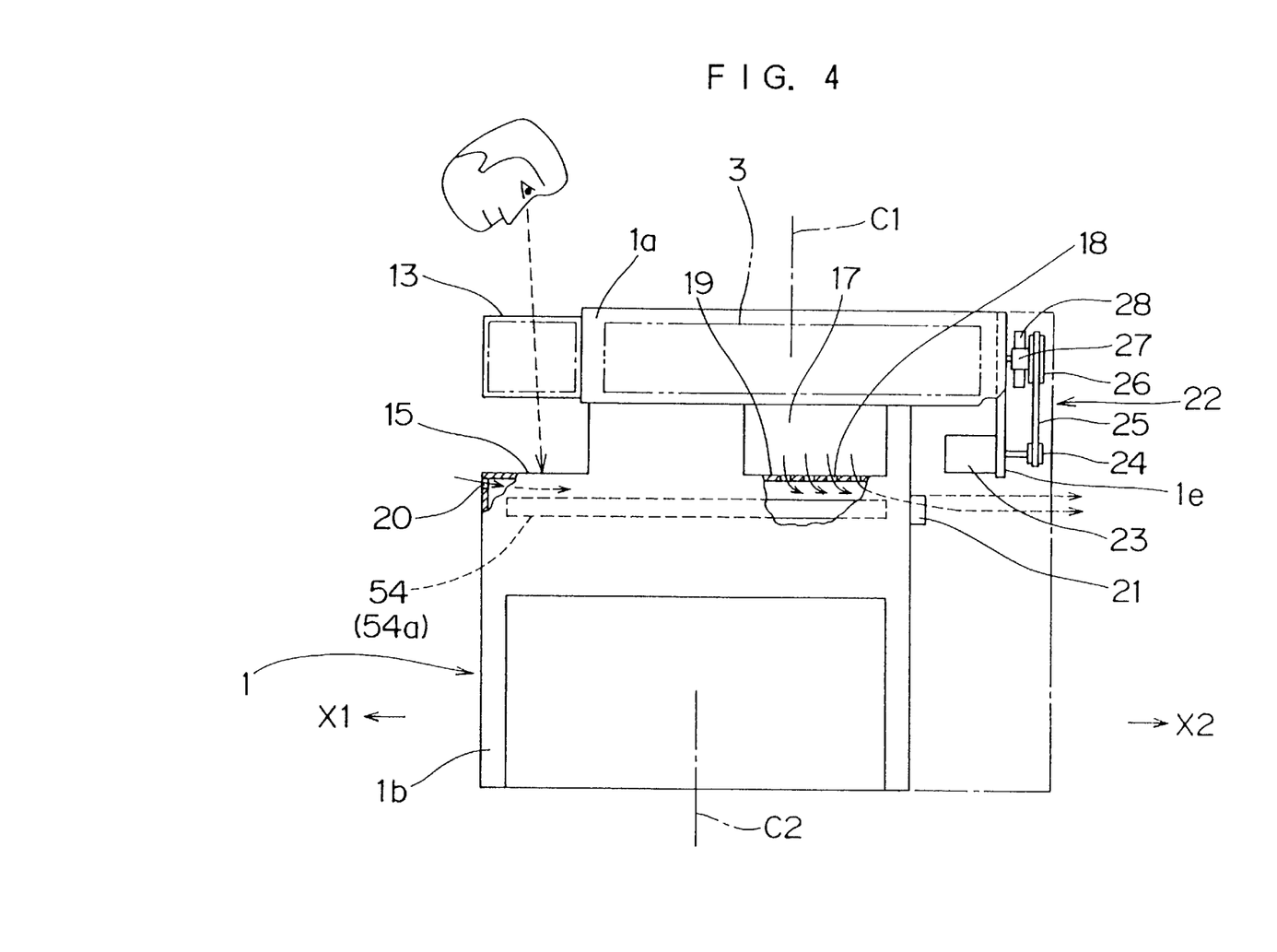
FIG. 4 is a partially broken schematic right side view of the main body of the image forming apparatus.

Referring to FIG. 4 which is a partially cutaway right side view of the main body of the image forming apparatus 1 (FIG. 4 shows a state where a surface cover on the right side surface of the main body of the image forming apparatus 1 is removed so that a pate-shaped frame is exposed), the fixing roller 54 is arranged along the forward direction X1 and the backward direction X2 in the image forming apparatus, and is in close proximity to the main vent holes 18. A fan for air blowing 21 is arranged in close proximity to a rear end in the axial direction of the fixing roller 54, and the fan 21 sucks air from the vent holes 20 and 18 to blow air backward X2 in the axial direction of the fixing roller 54. The periphery of the fixing roller 54 is so sectioned that air hardly flows into the fixing roller 54 from portions other than the vent holes 20 and 18. Further, the amount of air introduced from the sub vent hole 20 is so set as to be significantly smaller than the amount of air introduced from the whole of the main vent holes 18. On the other hand, the main vent holes 18 mainly correspond to a portion on the downstream side of the flow of air flowing into the fixing roller 54, to mainly cool the portion on the downstream side in the direction of air blowing. Consequently, the temperature distribution in the axial direction of the fixing roller 54 is made uniform. The height of a lower end of a rear frame 1e is so set that the rear frame 1e does not block the flow of air expelled by the fan 21.

As shown in FIG. 4, the upper portion 1a is arranged in a state where it is shifted by a predetermined amount backward X2 from the lower portion 1b (in FIG. 4, C1 denotes a line indicating the center in the longitudinal direction of the optical system 3, and C2 denotes a line indicating the center in the longitudinal direction of the image forming section). Consequently, a vacant space is formed in front X1 of the upper portion 1a. The operation panel 13 is so arranged as to occupy a part of the vacant space (see FIG. 1), and a side space 16 is formed on the right Y2 of the operation panel 13 by the remaining vacant space. An operator can visually confirm from above the presence or absence of the paper sheets P discharged into the paper discharging section 15, as shown in FIG. 4, through the side space 16. Since the side space 16 is positioned above the rear ends Pa in the direction of conveyance of the discharged paper sheets P, as shown in FIG. 1, it can be easily visually confirmed whether or not the paper sheets P exist in the paper discharging section 15 irrespective of the paper size.

Figure 6:
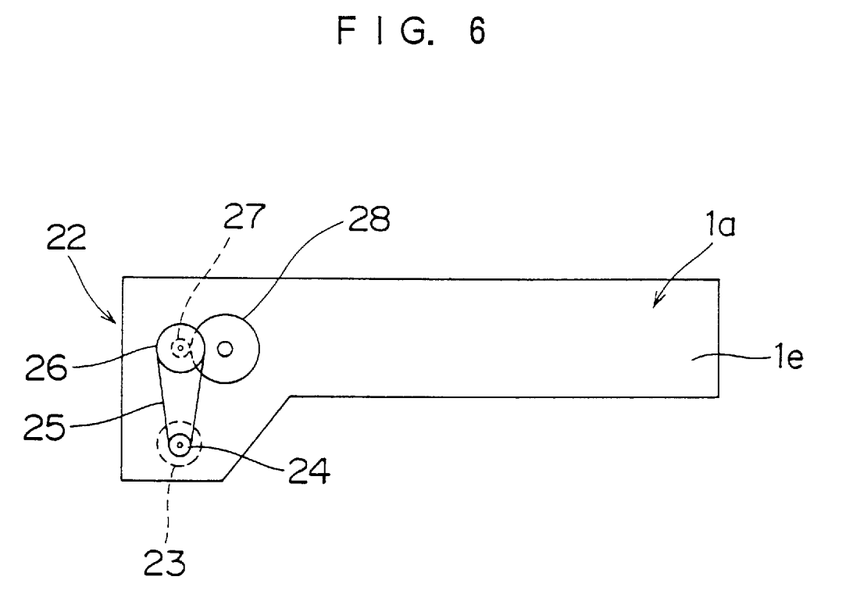
FIG. 6 is a schematic view showing a rear frame of an upper portion.

Referring to FIG. 4 and FIG. 6 showing a rear frame of the upper portion 1a, a driving mechanism 22 for driving the optical system 3 contained in the upper portion 1a is supported on the rear frame 1e in the upper portion 1a. The driving mechanism 22 comprises a motor 23, a driving pulley 24 fixed to the axis of rotation of the motor 23, a driven pulley 26 driven by the driving pulley 24 through a belt 25, a first gear 27 rotated integrally with the driven pulley 26, and a second gear 28 engaged with the first gear 27. The motor 23 and the driven pulley 24 out of the members 23 to 27 included in the driving mechanism 22 are arranged behind X2 the lower portion 1b. Particularly, the motor 23 is arranged in a vacant space, where the lower portion 1b does not exist, formed below the upper portion 1a by shifting the upper portion 1a backward. If the upper portion 1a is merely shifted backward with the motor 23 arranged on the rear surface of the upper portion 1a, a plane space occupied by the whole of the image forming apparatus is widened. In the present embodiment, however, the motor 23 is arranged in a space, where the lower portion does not exist, below the upper portion, a plane space occupied by the image forming apparatus is not increased.

Since the motor 23 is mounted short of the rear frame 1e, it is arranged at a distance away from a rear cover of the main body of the image forming apparatus 1 (that is, in an inner part of the main body of the image forming apparatus 1), and is arranged in a state where it is shielded by the rear frame 1e, as compared with a conventional case where it is mounted on an outer side surface of the rear frame 1e. As a result, a motor sound at the time of operating the apparatus cannot easily escape outward from the apparatus, whereby the decrease in noise is expected.

As shown in FIG. 3, a paper conveying path is so set that the paper sheets P are discharged in a state where front edges Pb on the take-out side of the paper sheets P discharged into the paper discharging section 15 are along a line L at a predetermined small distance d (for example, 20 mm) apart from the front edge 15b of the paper discharging section 15. That is, the paper conveying path forms a so-called front basis of the apparatus. Since the paper conveying path thus forms a front basis, the front edges Pb of the paper sheets P discharged into the paper discharging section 15 are at a predetermined small distance (for example, 20 mm) apart from the front edge 15b of the paper discharging section 15. As a result, the paper sheets P are easily taken out forward from the paper discharging section 15 irrespective of the paper size.

As described in the foregoing, according to the present embodiment, the operator can visually confirm the paper sheets P discharged into the paper discharging section 15 through the side space 16 from so as not to forget to take the paper sheets P.

The side space 16 is positioned above the rear ends Pa in the direction of conveyance of the discharged paper sheets P, whereby the presence or absence of the paper sheets P can be confirmed irrespective of the paper size. As a result, the paper sheets P can be reliably prevented from being forgotten to be taken.

Furthermore, the paper sheets P are conveyed on the front basis of the apparatus. Therefore, the front edges Pb of the paper sheets P discharged into the paper discharging section 15 are positioned near the front edge 15b of the paper feeding section 15 irrespective of the paper size. As a result, the paper sheets P can be easily taken out forward from the paper discharging section 15.

The present invention is not limited to the above-mentioned embodiment. For example, in the above-mentioned embodiment, the upper portion 1a of the main body of the image forming apparatus 1 is shifted backward X2, whereby the side space 16 is ensured beside the operation panel 13. When the side space 16 can be ensured even if the upper portion 1a is not shifted, however, it may be ensured without shifting the upper portion 1a. In any case, the side space 16 for visually confirming the paper sheets P discharged into the paper discharging section 15 may be formed. The arrangement of the side space 16 is not limited to the right Y2 of the operation panel 13. For example, it may be arranged on the left Y1. In addition thereto, various changes can be made in the range of the present invention.

EFFECT OF THE INVENTION

In the present invention, the paper discharging section is provided in the main body of the image forming apparatus, whereby economy of space can be achieved. Moreover, the paper sheets discharged into the paper discharging section can be visually confirmed from above through the side space beside the operation panel, whereby the paper sheets are not forgotten. Further, the operation panel is provided in an upper part on the front side of the main body of the image forming apparatus, whereby the automatic document feeder (ADF) can be arranged on the upper surface of the main body of the image forming apparatus.

Furthermore, in the present invention, the front edges of the paper sheets discharged into the paper discharging section are along a line using the front edge of the paper discharging section as a basis, whereby the paper sheets are easily taken out forward from the paper discharging section irrespective of the paper width.

Additionally, in the present invention, if the side space is positioned above the rear ends in the direction of conveyance of the discharged paper sheets, the paper sheets can be visually confirmed from above irrespective of the length along the direction of conveyance of the paper sheets, whereby the paper sheets are not forgotten.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

a main body without side projections for use in holding discharged sheets, an upper portion and a lower portion provided in said main body, and a paper discharging section into which paper sheets each with an image recorded thereon are discharged, said discharging section being formed between said upper portion and said lower portion on an upper surface of said lower portion to thereby avoid side projections on said main body, wherein said upper portion has a front edge, and wherein a side of said front edge forms a space above said paper discharging section so that paper sheets discharged into said paper discharging section can be confirmed visually by looking from above said space, through said space into said discharging section.

2. The image forming apparatus according to claim 1, wherein said upper portion includes an optical system for illuminating and scanning an original, and an operation panel having various operation keys, a section containing said optical system, said section being approximately rectangular as viewed from above said section, and said operation panel projects from a part of a front edge of said optical system containing section, said space being formed in a portion other than where said operation panel is positioned in front of said optical system containing section.

3. The image forming apparatus according to claim 2, wherein said lower portion comprises an image forming section and a paper conveying path for conveying the paper sheets, said paper conveying path being so constructed that the pater sheets, which are fed to said image forming section and are discharged into said paper discharging section after an image formed in said image forming section is recorded thereon, are conveyed along a front edge of said lower portion.

4. The image forming apparatus according to claim 3, wherein said paper discharging section is inclined so that a rear end of a paper sheet discharged into said paper discharging section is held below a remainder of the sheet.

5. The image forming apparatus according to claim 4, wherein said space is located where parts of the rear ends of paper sheets discharged into said paper discharging section can be visually confirmed.

6. The image forming apparatus according to claim 2, further comprising a connecting portion for connecting said upper portion and said lower portion with each other, a window for introducing light toward said paper discharging section, said window being formed in said connecting portion.

7. The image forming apparatus according to claim 6, wherein said upper portion is shifted rearwardly with respect to said lower portion by a predetermined amount toward a rear edge of said lower portion as viewed from above said lower portion.

8. The image forming apparatus according to claim 7, wherein said lower portion defines a space below said upper portion near said rear edge thereof, and said upper portion includes a driving mechanism including a motor for driving said optical system, said driving mechanism being so arranged as to project toward said space defined by said lower portion.

9. The image forming apparatus according to claim 8, wherein said motor is positioned in a contour of said upper portion which is approximately rectangular as viewed from above said upper portion.

10. The image forming apparatus according to claim 1, wherein said upper portion and said lower portion are separable from each other, and when separated, said upper portion and said lower portion being assembled by placing said upper portion upon said lower portion.

11. The image forming apparatus according to claim 10, wherein said lower portion has an opening in said upper surface thereof for admitting an operator's hands when said upper portion is placed upon said lower portion for assembly of said apparatus.

* * * * *